(12) United States Patent
Zhong et al.

(10) Patent No.: US 8,297,467 B2
(45) Date of Patent: Oct. 30, 2012

(54) SLOW COOKER

(75) Inventors: Chengen Zhong, Shunde District (CN);
Pingtao Chen, Shunde District (CN);
Yun Yang, Shunde District (CN)

(73) Assignee: Midea Group Co., Ltd., Guangdong Province (CN)

( * ) Notice: Subject to any disclaimer, the term of this patent is extended or adjusted under 35 U.S.C. 154(b) by 0 days.

(21) Appl. No.: 13/175,894

(22) Filed: Jul. 4, 2011

(65) Prior Publication Data
US 2012/0193364 A1    Aug. 2, 2012

(30) Foreign Application Priority Data

Jan. 28, 2011  (CN) .................... 2011 2 0030201 U

(51) Int. Cl.
*A47J 27/00*   (2006.01)
*B65D 5/08*   (2006.01)
*B65D 5/00*   (2006.01)
*B65D 27/14*   (2006.01)
*B65D 27/22*   (2006.01)

(52) U.S. Cl. .................... 220/573.1; 292/137; 292/138; 292/145; 292/80; 292/82; 220/212.5; 220/756; 220/324; 220/573.4

(58) Field of Classification Search ............... 220/573.1, 220/212.5, 756, 324, 573.4; 24/589.1, 651; 292/256, 145, 152, 303, 137–138, 80–81, 292/87, DIG. 63, DIG. 60, DIG. 11
See application file for complete search history.

(56) References Cited

U.S. PATENT DOCUMENTS 2,843,440 A * 7/1958 Billig et al. .................. 312/284
5,465,472 A * 11/1995 Matoba .......................... 24/625

* cited by examiner

*Primary Examiner* — J. Gregory Pickett
*Assistant Examiner* — James M Van Buskirk

(57) ABSTRACT

A slow cooker comprising a housing, a container disposed in a hollow body of the housing, a lid, and a sealing ring sealingly engages the lid and the container. The container has a rim disposed with an engaging means. The engaging means comprises a movable member and an upper stationary member. The upper stationary member has an upper surface disposed with a sliding plate. The sliding plate has a limiting end surface atop for limiting movement of the movable member. A space is formed between the limiting end surface and the sliding plate for a tongue of the movable member to pass through. The movable member is disposed on the sliding plate. The tongue of the movable member passes through the space to press onto the lid, and the movable member is secured onto the sliding plate via a snapping means.

3 Claims, 8 Drawing Sheets

SLOW COOKER

BACKGROUND OF THE INVENTION

The present invention relates to a slow cooker and more particular pertains to an improved slow cooker with a lid and a container which could be engaged with each other to prevent spillage of liquid content.

Slow cookers available for sale in the marketplace nowadays are provided with lids placed on the upper rims of the containers. There is no reliable mechanism for securing the lid and the container together. In general, after the cooking is done, the user will move the slow cooker or the container filled with food. As there is no reliable securing mechanism, the lid may easily slide off during the moving process. Further, vibration in the moving process may lead to a possible spill-out of liquid content inside the container, therefore creating a potential for the user to be burnt.

Patent No. CN200920198406 discloses a slow cooker with a touch-control structure. The container is covered with a lid atop. The lower side of the upper rim of the container is disposed with a symmetrically opposed pair of handle lower covers. The handle lower covers each has a spring hole at an interior middle position. The spring holes each receives a spring and a steel bead. The handle lower covers are each disposed with a handle upper cover atop. A locking member is disposed between the handle lower cover and the handle upper cover. The base of the locking member slidingly presses against the steel bead, and the steel bead serves to limit the sliding position of the locking member. The rim of the lid is disposed with a sealing ring therebeneath. The sealing ring which is made of silicone and forms a closed ring structure controls the sealing engagement between the lid and the container. The aforementioned design provides an additional locking member between the container and the lid to seal the container, but it has many structural parts and is complicated to assemble, high in costs and low in efficiency. Moreover, the friction area of the locking member is large, leading to strong resistance and unsmooth operation. Further, as the aforementioned design makes use of the spring to press the steel bead upwards for positioning, the locking strength is therefore reduced as the elasticity of the spring weakens after prolonged use, therefore resulting in easy loosening of the locking member.

Patent No. CN200710005602 discloses a slow cooker which comprises a housing, a container and a lid. The lid has an outer rim which is circled by a gasket and covers the opening of the container. The side wall of the housing is disposed with at least one over-the-center clip which may be selectively engaged with the lid to retain the lid in sealing engagement with the container, thereby preventing leakage of the food stuffs from within the container. The aforementioned clip has a hook and a lever. The hook engages with the lid to retain the lid in sealing engagement with the container. A catch must be provided on the lid for engaging with the hook, which results in increase in raw material demand as well as costs. Particularly, slow cookers available for sale in the marketplace nowadays are provided with glass lids, and it involves a complicated manufacturing process to mount a catch onto a glass lid. As the number manufacturing steps are increased, the efficiency is lowered.

BRIEF SUMMARY OF THE INVENTION

An object of the present invention is to provide a slow cooker which is simple in structure, convenient and practical, and is capable of preventing spillage of liquid content. The present invention is convenient to operate, uses only few component parts, simple to assemble, and is therefore capable of substantially lowering the costs and enhancing manufacturing efficiency.

To attain this, the slow cooker of the present invention comprises a housing, a container disposed in a hollow body of the housing, a lid and a sealing ring which sealingly engage the lid and the container. The container has a rim which is securely disposed with an engaging means for engaging with the lid. The engaging means comprises a movable member and an upper stationary member securely disposed on the rim of the container. The upper stationary member has an upper surface which is disposed with a sliding plate for the movable member to move thereon. The sliding plate has a limiting end surface atop for limiting movement of the movable member. A space is formed between the limiting end surface and the sliding plate for a tongue of the movable member to pass through. The movable member is disposed on the sliding plate of the upper stationary member. The tongue of the movable member passes through the space of the upper stationary member to press onto the lid, and the movable member is secured onto the sliding plate of the upper stationary member via a snapping means.

The sliding plate is disposed with a hollow engaging grove in a middle portion thereof. The movable member has two positioning rims at two sides thereof and the positioning rims are supported by two sides of the sliding plate respectively. The said snapping means comprises a toothed portion at each of the two sides of the engaging groove. The movable member is disposed with elastic catches therebeneath which correspondingly engage with the toothed portions.

The movable member is disposed with a positioning step surface at an end opposite to the tongue.

The tongue may be integrally formed with the movable member. Alternatively, the tongue may be formed separately and thereafter secured onto the movable member.

The upper stationary member is secured on a container handle disposed at the rim of the container.

The upper stationary member is secured onto the container handle at the rim of the container via a lower stationary member. The lower stationary member is in form of a semi-opened frame with a closed end for limiting movement of the movable member, an open end facing towards the container handle, and grooves disposed on two side walls of the lower stationary member for receiving the container handle. The lower stationary member has a top end and a bottom end which are disposed on an upper side and a lower side of the container handle respectively. The container handle is disposed with installation holes; the bottom end of the lower stationary member is correspondingly disposed with screw holes. The top end of the lower stationary member is disposed with an open groove along which the movable member moves. The upper stationary member is disposed between the container handle and the top end of the lower stationary member, and a positioning groove is formed between the upper stationary member and the top end of the lower stationary member. The upper stationary member has a lower side disposed with protruding screw shafts which correspond with the installation holes of the container handle. The screw shafts are internally threaded and pass through the installation holes of the container handle from top to bottom to be inserted in the installation holes of the container handle. A screw threaded coupling members sequentially passes through each of the screw holes at the bottom end of the lower stationary member and each of the screw shafts of the upper stationary member from bottom to top so as to securely fasten the upper stationary member, the lower stationary member and the container handle together.

The top end of the lower stationary member is further disposed with insertion pins for secure engagement. The upper stationary member is disposed with recesses at an upper end thereof. The insertion pins of the lower stationary member are fastened with a snap fit in the recesses at the upper end of the upper stationary member.

The movable member is disposed with upward protruding members on an upper surface thereof for convenient operation.

In the present invention, as the tongue of the movable member passes through the space of the upper stationary member to press onto the lid, and the movable member is secured onto the sliding plate of the upper stationary member via the snapping means, the movable member may selectively engage with the lid or be released from the lid. The lid and the container may therefore engage with each other or released from each other. Such engagement or release of the lid is controlled by simply pushing the movable member. The present invention therefore attains effective sealing engagement of the lid and the container, and the lid is guaranteed not to be slid off during the moving process of the slow cooker. Even if there are vibrations, the liquid content with the container would not spill out. The present invention is simple in structure, convenient to operate, uses only few component parts, simple to assemble, and is therefore capable of enhancing manufacturing efficiency and substantially lowering the costs. The present invention is ingeniously designed, stable in performance, safe and reliable, and convenient and practical.

Figure 1:
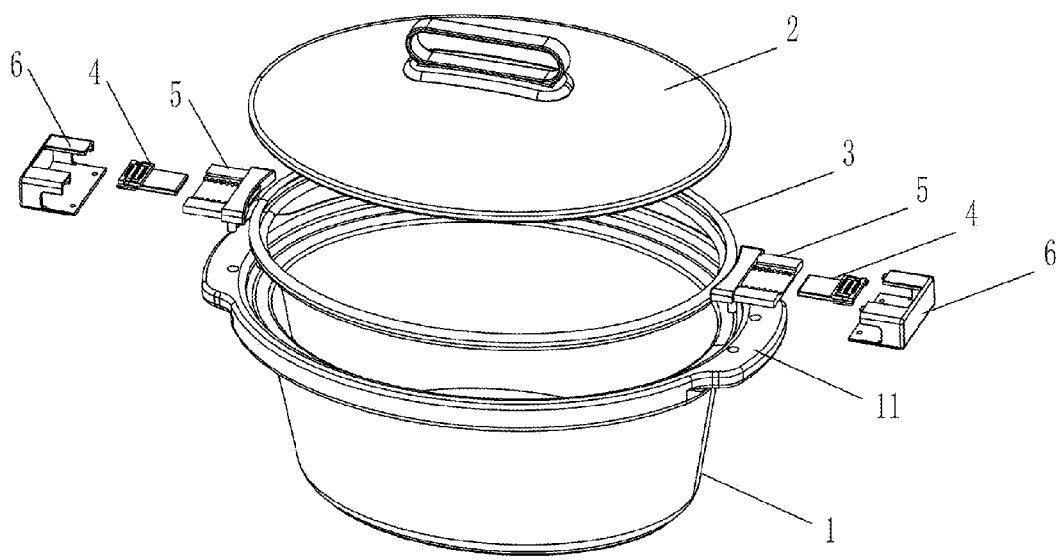
FIG. 1 shows a dissembling view of the slow cooker in accordance with the preferred embodiment of the present invention.

Components which are not relevant to the present invention are not shown in the aforementioned figures.

DETAILED DESCRIPTION OF THE INVENTION

As illustrated in the figures, the slow cooker of the present invention comprises a housing, a container 1 disposed in a hollow body of the housing, a lid 2 and a sealing ring 3 which sealingly engage the lid 2 and the container 1. The container 1 has a rim which is securely disposed with an engaging means for engaging with the lid 2. The engaging means comprises a movable member 4 and an upper stationary member 5 securely disposed on the rim of the container 1. The upper stationary member 5 has an upper surface which is disposed with a sliding plate 58 for the movable member 4 to move thereon. The sliding plate 58 has a limiting end surface 54 atop for limiting movement of the movable member 4. A space 57 is formed between the limiting end surface 54 and the sliding plate 58 for a tongue 43 of the movable member 4 to pass through. The movable member 4 is disposed on the sliding plate 58 of the upper stationary member 5. The tongue 43 of the movable member 4 passes through the space 57 of the upper stationary member 5 to press onto the lid 2, and the movable member 4 is secured onto the sliding plate 58 of the upper stationary member 5 via a snapping means.

In the present embodiment, the sliding plate 58 is disposed with a hollow engaging grove 51 in a middle portion thereof. The movable member 4 has two positioning rims 42 at two sides thereof and the positioning rims are supported by two sides of the sliding plate 58 respectively. The said snapping means comprises a toothed portion 53 at each of the two sides of the engaging groove 51. The movable member 4 is disposed with elastic catches 41 therebeneath which correspondingly engage with the toothed portions 53.

Furthermore, the movable member 4 is disposed with a positioning step surface 45 at an end opposite to the tongue 43.

The tongue 43 may be integrally formed with the movable member 4. Alternatively, the tongue 43 may be formed separately and thereafter secured onto the movable member 4. In the present embodiment, for the sake of processing convenience, the movable member 4 and the tongue 43 are integrally formed.

In the present embodiment, the container 1 is disposed at an upper rim thereof with a diametrically opposing pair of container handles 11 which protrudes horizontally outwards. The upper stationary member 5 is secured on the container handle 11 at the rim of the container 1.

For the sake of convenient assembly, the upper stationary member 5 is secured onto the container handle 11 at the rim of the container 1 via a lower stationary member 6. The lower stationary member 6 is in form of a semi-opened frame with a closed end 65 for limiting movement of the movable member 4, an open end facing towards the container handle 11, and grooves 63 disposed on two side walls of the lower stationary member 6 for receiving the container handle 11. The lower stationary member 6 has a top end and a bottom end which are disposed on an upper side and a lower side of the container handle 11 respectively. The container handle 11 is disposed with installation holes 12; the bottom end of the lower stationary member 6 is correspondingly disposed with screw holes 61. The top end of the lower stationary member 6 is disposed with an open groove 64 along which the movable member 4 moves. The upper stationary member 5 is disposed between the container handle 11 and the top end of the lower stationary member 6, and a positioning groove 56 is formed between the upper stationary member 5 and the top end of the lower stationary member 6. The upper stationary member 5 has a lower side disposed with protruding screw shafts 52 which correspond with the installation holes 12 of the container handle 11. The screw shafts 52 are internally threaded and pass through the installation holes 12 of the container handle 11 from top to bottom to be inserted in the installation holes 12 of the container handle 11. A screw threaded coupling member 7 sequentially passes through each of the screw holes 61 at the bottom end of the lower stationary member 6 and each of the screw shafts 52 of the upper stationary member 5 from bottom to top so as to securely fasten the upper stationary member 5, the lower stationary member 6 and the container handle 11 together. The positioning rims 42 at the two sides of the movable member 4 are supported on the two sides of the sliding plate 58. The movable member 4 is received with a snap fit in the positioning groove 56 between the upper stationary member 5 and the top end of the lower stationary member 6, so that the movable member 4 could not be released. The positioning rim 42 is designed to be shorter in length, so that it could horizontally move along the positioning groove 56 and would not impede the horizontal movement of the movable member 4.

The top end of the lower stationary member 6 is further disposed with insertion pins 62 for secure engagement. The upper stationary member 5 is disposed with recesses 55 at an upper end thereof. The insertion pins 62 of the lower stationary member 6 are fastened with a snap fit in the recesses 55 at the upper end of the upper stationary member 5. In the present embodiment, the recesses 55 are countersinks.

For the sake of convenient operation, the movable member 4 is disposed with upward protruding members 44 on an upper surface thereof for convenient operation.

Figure 2:
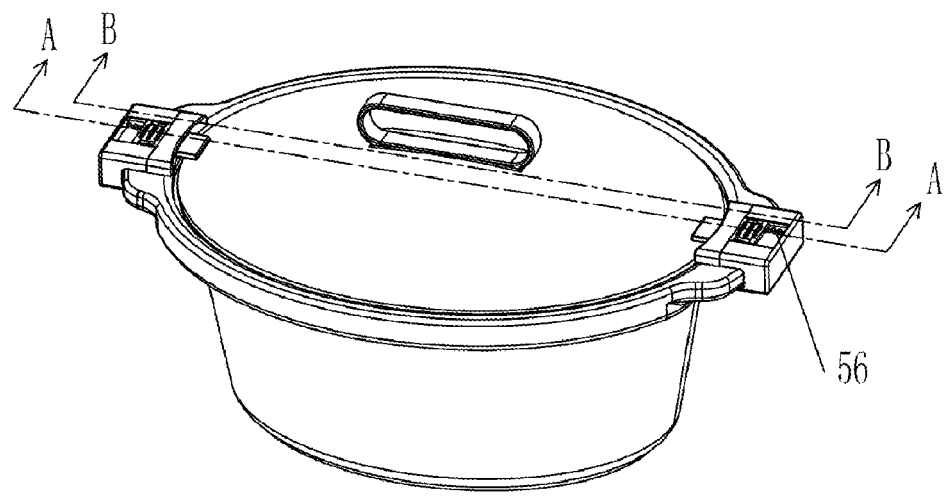
FIG. 2 shows a perspective view of the slow cooker in accordance with the preferred embodiment of the present invention in the engaged position.
Figure 3:
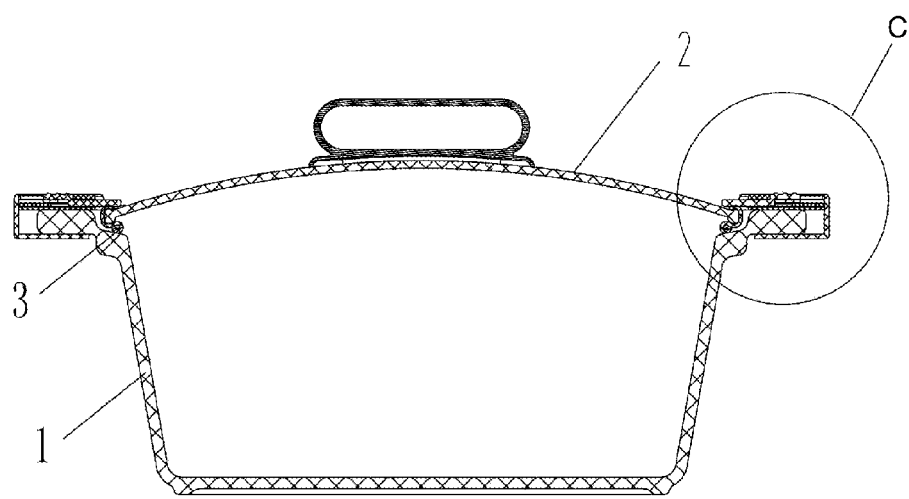
FIG. 3 shows an A-A cross sectional view of the slow cooker in accordance with the preferred embodiment of the present invention in the engaged position.
Figure 4:
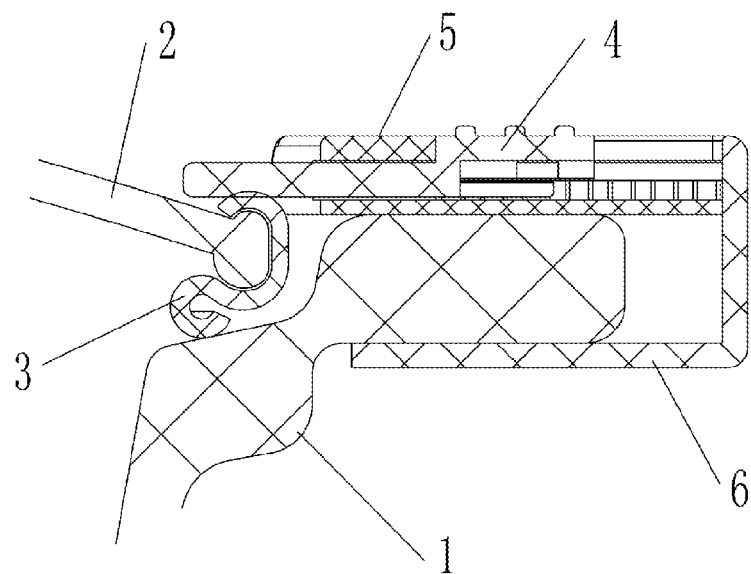
FIG. 4 is an enlarged view of part C in FIG. 3.
Figure 5:
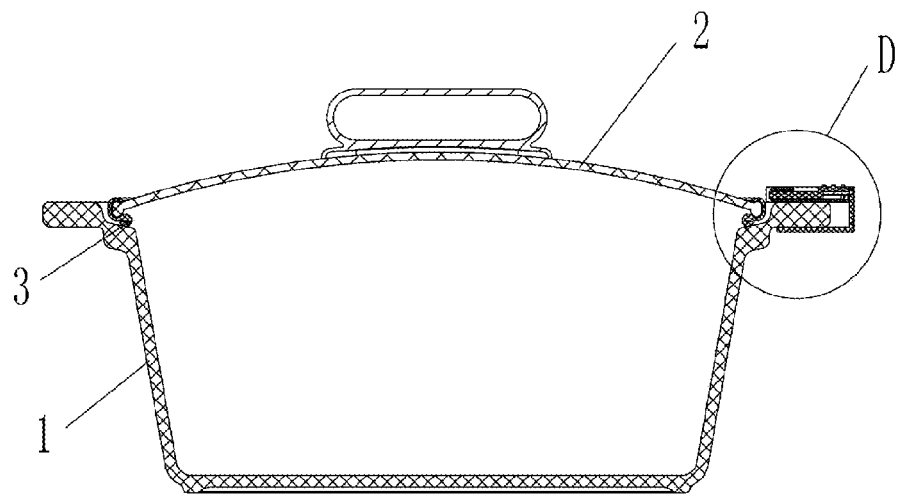
FIG. 5 is an A-A cross sectional view of the slow cooker in accordance with the preferred embodiment of the present invention in the released position.
Figure 6:
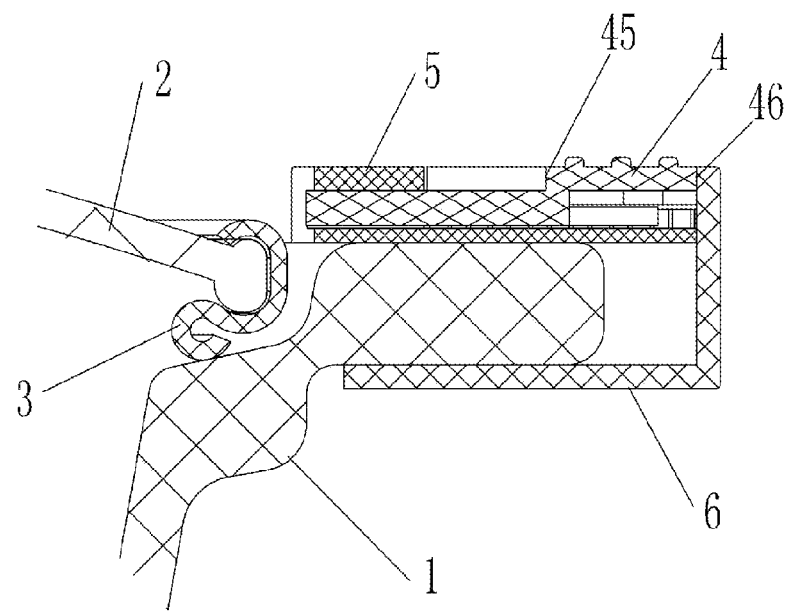
FIG. 6 is an enlarged view of part D in FIG. 5.
Figure 7:
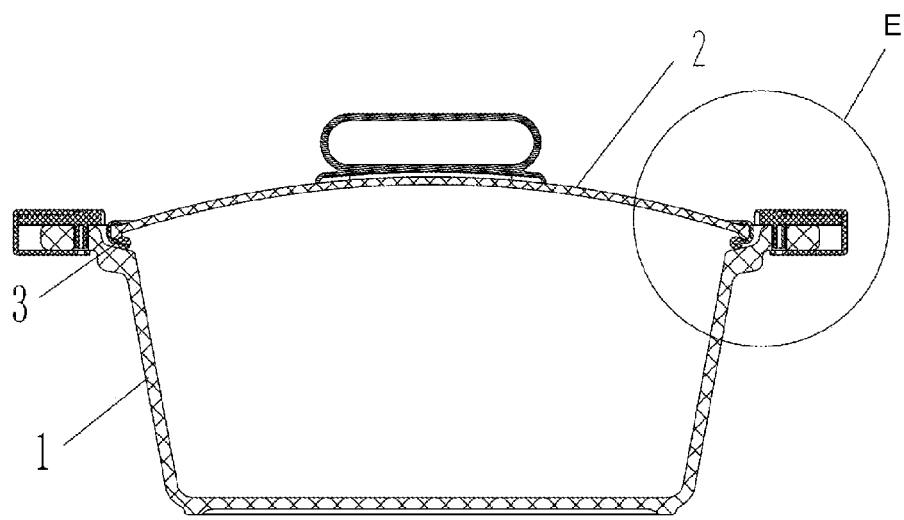
FIG. 7 is a B-B cross sectional view of the slow cooker in accordance with the preferred embodiment of the present invention in the released position.
Figure 8:
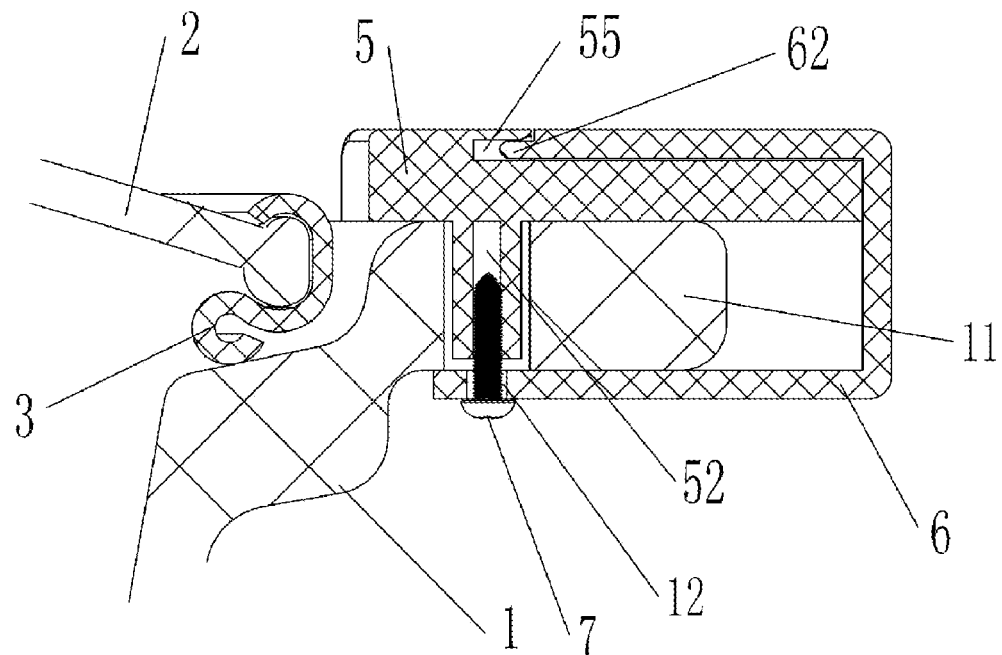
FIG. 8 is an enlarged view of part E in FIG. 7.
Figure 9:
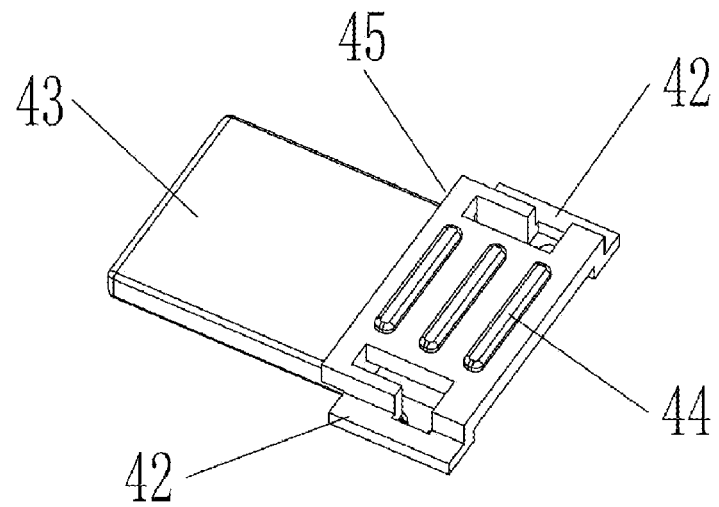
FIG. 9 is a perspective view illustrating a front side of the moving member in accordance with the preferred embodiment of the present invention.
Figure 10:
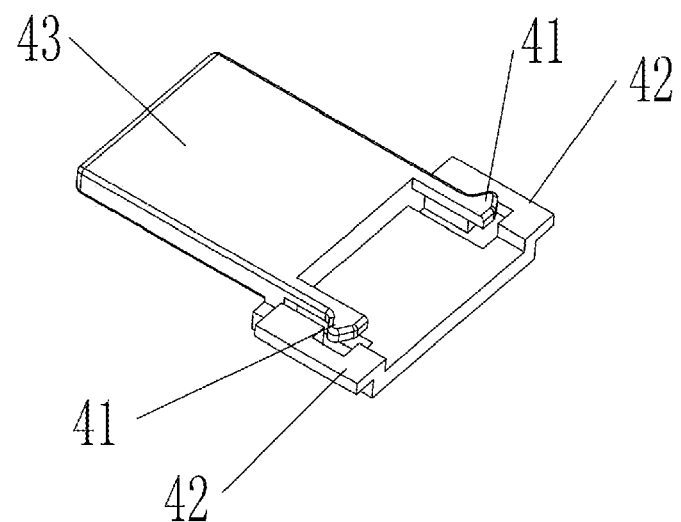
FIG. 10 is a perspective view illustrating the rear side of the moving member in accordance with the preferred embodiment of the present invention.
Figure 11:
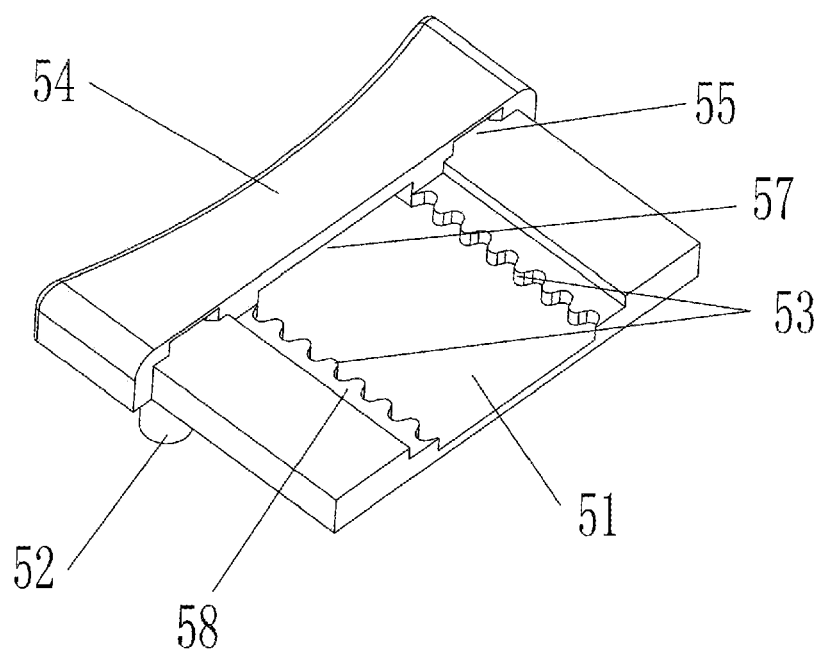
FIG. 11 is a perspective view illustrating the front side of the upper stationary member in accordance with the preferred embodiment of the present invention.
Figure 12:
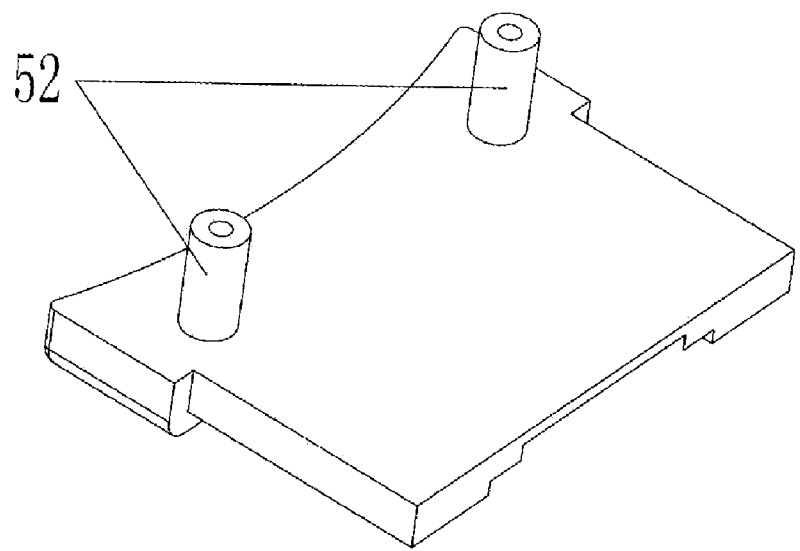
FIG. 12 is a perspective view illustrating the rear side of the upper stationary member in accordance with the preferred embodiment of the present invention.
Figure 13:
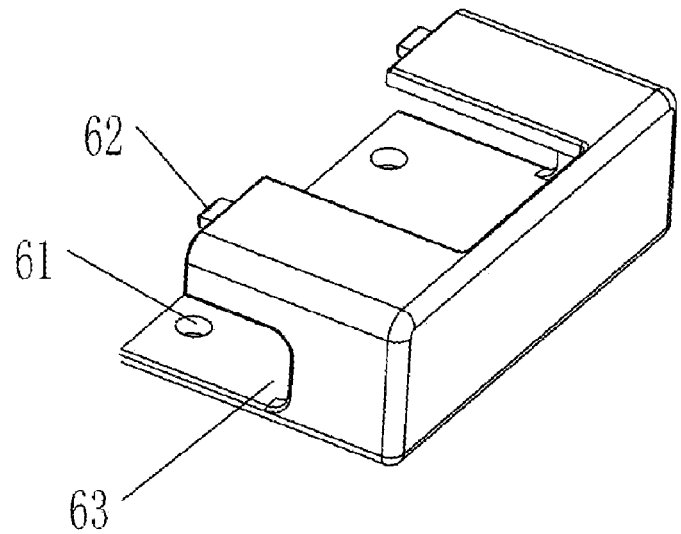
FIG. 13 is a perspective view illustrating the front side of the lower stationary member in accordance with the preferred embodiment of the present invention.
Figure 14:
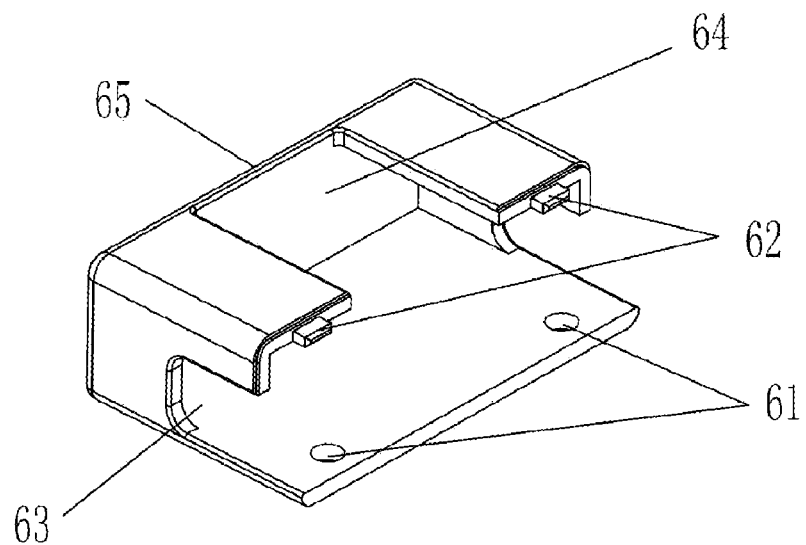
FIG. 14 is a perspective view illustrating the rear side of the lower stationary member in accordance with the preferred embodiment of the present invention.
Figure 15:
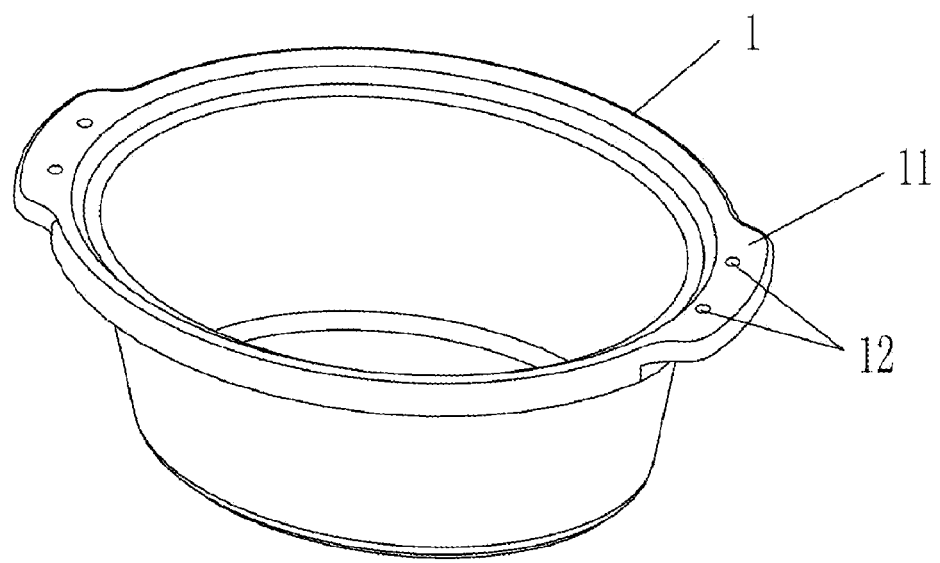
FIG. 15 is a perspective view of the container in accordance with the preferred embodiment of the present invention.

The working principle of the present invention is as follows: As illustrated in FIG. 2 to FIG. 4, to engage the lid 2 and the container 1, the lid 2 is placed on the container 1, and the movable member 4 is pushed towards the lid 2; the elastic catch 41 of the movable member 4 is elastically deformed and moves along the toothed portion 53 towards the lid 2, so that the movable member 4 moves along the sliding plate 58 of the upper movable member 5 until the positioning step surface 45 of the movable member 4 abuts against the limiting surface 54 of the upper stationary member 5. The movable member 4 is stopped from moving further, and the tongue 43 of the movable member 4 rests atop the lid 2, thereby limiting movement of the lid 2. The lid 2 and the container 1 are now at an engaged position.

As illustrated in FIG. 5 to FIG. 8, the movable member 4 is moved away from the lid 2. The elastic catch 41 of the movable member is elastically deformed and moves along the toothed portion 53 and away from the lid 2, so that the movable member 4 moves along the sliding plate 58 of the upper stationary member until an outward end 46 of the movable member 4 abuts against the closed end 65 of the lower stationary member 6. The movable member 4 is stopped from moving further, and the tongue 43 of the movable member 4 returns to rest within the upper stationary member 5 and therefore no longer impedes movement of the lid 2. The lid 2 and the container 1 are now at a released position and the lid 2 could be released.

What is claimed is:

1. A slow cooker which comprises a housing, a container (1) disposed in a hollow body of the housing, a lid (2), and a sealing ring (3) which sealingly engages the lid (2) and the container (1); the container (1) has a rim which is securely disposed with an engaging means for engaging with the lid (2); characterized in that the engaging means comprises a movable member (4) and an upper stationary member (5) securely disposed on the rim of the container (1); the upper stationary member (5) has an upper surface which is disposed with a sliding plate (58) for the movable member (4) to move thereon; the sliding plate (58) has a limiting end surface (54) atop for limiting movement of the movable member (4); a space (57) is formed between the limiting end surface (54) and the sliding plate (58) for a tongue (43) of the movable member (4) to pass through; the movable member (4) is disposed on the sliding plate (58) of the upper stationary member (5); the tongue (43) of the movable member (4) passes through the space (57) of the upper stationary member (5) to press onto the lid (2); the movable member (4) is secured onto the sliding plate (58) of the upper stationary member (5) via a snapping means; the sliding plate (58) is disposed with a hollow engaging grove (51) in a middle portion thereof; the movable member (4) has two positioning rims (42) at two sides thereof and the positioning rims are supported by two sides of the sliding plate (58) respectively; the snapping means comprises a toothed portion (53) at each of the two sides of the engaging groove (51); the movable member (4) is disposed with elastic catches (41) thereberneath which correspondingly engage with the toothed portions (53); the upper stationary member (5) is secured on a container handle (11) at the rim of the container (1) via a lower stationary member (6); the lower stationary member (6) is in form of a semi-opened frame with a closed end (65) for limiting movement of the movable member (4), an open end of the lower stationary member (6) faces towards the container handle (11); grooves (63) are disposed on two side walls of the lower stationary member (6) for receiving the container handle (11); the lower stationary member (6) has a top end and a bottom end which are disposed on an upper side and a lower side of the container handle (11) respectively; the container handle (11) is disposed with installation holes (12); the bottom end of the lower stationary member (6) is correspondingly disposed with screw holes (61); the top end of the lower stationary member (6) is disposed with an open groove (64) along which the movable member (4) moves; the upper stationary member (5) is disposed between the container handle (11) and the top end of the lower stationary member (6); a positioning groove (56) is formed between the upper stationary member (5) and the top end of the lower stationary member (6); the upper stationary member (5) has a lower side disposed with protruding screw shafts (52) which correspond with the installation holes (12) of the container handle (11); the screw shafts (52) are internally threaded and pass through the installation holes (12) of the container handle (11) from top to bottom to be inserted in the installation holes (12) of the container handle (11); and a screw threaded coupling member (7) sequentially passes through each of the screw holes (61) at the bottom end of the lower stationary member (6) and each of the screw shafts (52) of the upper stationary member (5) from bottom to top so as to securely fasten the upper stationary member (5), the lower stationary member (6) and the container handle (11) together.

2. The slow cooker as in claim 1, characterized in that the top end of the lower stationary member (6) is further disposed with insertion pins (62) for secure engagement; the upper stationary member (5) is disposed with recesses (55) at an upper end thereof; the insertion pins (62) of the lower stationary member (6) are fastened with a snap fit in the recesses (55) at the upper end of the upper stationary member (5).

3. The slow cooker as in claim 2, characterized in that the movable member (4) is disposed with upward protruding members (44) on an upper surface thereof for convenient operation.

* * * * *